United States Patent
Tanaka et al.

(10) Patent No.: US 10,797,780 B2
(45) Date of Patent: Oct. 6, 2020

(54) MULTISITE TRUNKING SYSTEM AND SITE SWITCHING METHOD

(71) Applicant: ICOM INCORPORATED, Osaka-shi, Osaka (JP)

(72) Inventors: Yoshiyuki Tanaka, Osaka (JP); Tatsuya Oka, Osaka (JP)

(73) Assignee: ICOM INCORPORATED, Osaka (JP)

( * ) Notice: Subject to any disclaimer, the term of this patent is extended or adjusted under 35 U.S.C. 154(b) by 0 days.

(21) Appl. No.: 16/322,016

(22) PCT Filed: Jul. 28, 2017

(86) PCT No.: PCT/JP2017/027432
§ 371 (c)(1),
(2) Date: Jan. 30, 2019

(87) PCT Pub. No.: WO2018/042978
PCT Pub. Date: Mar. 8, 2018

(65) Prior Publication Data
US 2019/0190586 A1 Jun. 20, 2019

(30) Foreign Application Priority Data
Aug. 31, 2016 (JP) .................................. 2016-170087

(51) Int. Cl.
*H04B 7/14* (2006.01)
*H04W 84/08* (2009.01)
(Continued)

(52) U.S. Cl.
CPC .............. *H04B 7/14* (2013.01); *H04W 16/26* (2013.01); *H04W 16/32* (2013.01); *H04W 24/08* (2013.01);
(Continued)

(58) Field of Classification Search
CPC ....................................................... H04B 7/14
See application file for complete search history.

(56) References Cited

U.S. PATENT DOCUMENTS

| 4,870,408 A * | 9/1989 | Zdunek ................. | H04W 84/08 370/341 |
| 2011/0065436 A1* | 3/2011 | Svedevall ............. | H04W 36/22 455/436 |
| 2016/0212671 A1* | 7/2016 | Ormsub ................ | H04W 16/32 |

FOREIGN PATENT DOCUMENTS

| EP | 2341734 | 7/2011 |
| EP | 3051876 | 8/2016 |

(Continued)

OTHER PUBLICATIONS

Digital Private Mobile Radio (dPMR) using FDMA with a channel spacing of 6,25kHz, ETSI TS 102 658 V2.5.1[online], Jul. 29, 2015 [retrieval date Sep. 4, 2017], Internet<URL:http://www.etsi.org/deliver/etsi ts/102600102699/102658/02.05.01_60/ts 102658v020501p.pdf>, p. 23-24, 53-54, 130-133,140, 234-235.

(Continued)

*Primary Examiner* — Edan Orgad
*Assistant Examiner* — Won Tae C Kim
(74) *Attorney, Agent, or Firm* — Ohlandt, Greeley, Ruggiero & Perle, L.L.P.

(57) ABSTRACT

Upon reception of ACK via a communication IF, an allocator allocates a channel of a repeater to be controlled to communications between wireless terminals. A determination unit determines whether channels allocatable to the communications between the wireless terminals are short. When the determination unit has determined that the allocatable channels are short, a switching controller controls at least one repeater, among repeaters to be controlled by a repeater controller, that serves as a controlling repeater to cause the repeater to transmit, to a wireless terminal standing (Continued)

by in the channel of the repeater, a switching signal designating standby in a channel of a repeater that is controlled by another repeater controller.

9 Claims, 12 Drawing Sheets

(51) Int. Cl.
    *H04W 28/08*     (2009.01)
    *H04W 16/26*     (2009.01)
    *H04W 16/32*     (2009.01)
    *H04W 24/08*     (2009.01)
    *H04W 72/04*     (2009.01)

(52) U.S. Cl.
    CPC ........... *H04W 28/08* (2013.01); *H04W 72/04* (2013.01); *H04W 84/08* (2013.01)

(56) References Cited

FOREIGN PATENT DOCUMENTS

| | | |
|---|---|---|
| EP | 3051876 A1 | 8/2016 |
| JP | 09271058 | 10/1997 |
| WO | 2013057798 | 4/2013 |
| WO | 2015039449 | 3/2015 |

OTHER PUBLICATIONS

International Search Report dated Sep. 12, 2017 in corresponding International Patent Application No. PCT/JP2017/027432, 4 pages.
Extended European Search Report dated Mar. 13, 2020 in corresponding EP Patent Application No. 17845987.1, 10 pgs.
Japanese Office Action dated Mar. 3, 2020 in corresponding Japanese Patent Application No. 2016-170087, 6 pages.

* cited by examiner

MULTISITE TRUNKING SYSTEM AND SITE SWITCHING METHOD

BACKGROUND

1. Field of the Disclosure

The present disclosure relates to a repeater controller, a repeater system, a multisite trunking system, a site switching method, and a non-transitory computer readable medium.

2. Discussion of the Background Art

A multisite trunking system has a plurality of repeater systems called sites. A repeater system includes a plurality of repeaters to each of which a unique channel is assigned. In the multisite trunking system, wireless terminals located at different sites, that is, wireless terminals communicating with different repeater systems may communicate via a repeater system. For a wireless terminal to communicate in the multisite trunking system, registration is required by registering in the repeater system. When a wireless terminal is powered on, the wireless terminal automatically makes a registration request to the repeater system. The wireless terminal registered in the repeater system stands by to be communicatable with another wireless terminal via the repeater system. When the wireless terminal moves outside the coverage area of the repeater system, for example, the wireless terminal needs to make another registration request to another repeater system.

In a mobile communication system disclosed in Patent Literature 1, a base station notifies a mobile station of a plurality of channel candidates to be at the time of switching the channel of the mobile station, so that the channel can be switched to a next channel candidate at high speed when channel switching fails.

CITATION LIST

Patent Literature

Patent Literature 1: Unexamined Japanese Patent Application Kokai Publication No. H9-271058

There may be a dead zone in the coverage area of the repeater system depending on positioning of antennas of the repeater system. Therefore, there is a case where with the repeater system serving as the master site, another repeater system is provided as a slave site for enabling communication in the dead zone within the coverage area of the repeater system. Thus, even when a wireless terminal moves to the dead zone in the master site, the wireless terminal may perform communication via the repeater system serving as the slave site.

Since the slave site is provided to compensate for the dead zone of the coverage area of the master site, the number of channels may be smaller than that of the master site. The European Telecommunication Standards Institute (ETSI) TS 102 658 specifies that the repeater system transmits a Vote Now signal designating standby in a channel of another repeater system to a wireless terminal registered in the repeater system. As the repeater system provided as a slave site transmits a Vote Now signal designating standby at the master site to the wireless terminal registered in the repeater system, which can suppress the shortage of the communication channel in the repeater system as the slave site. The repeater system serving as the slave site transmits the Vote Now signal at regular intervals. Therefore, even when the communication channels of the slave site are not short, switching of the repeater system may occur in the wireless terminal in some cases. Such switching suffers from an inability of the wireless terminal to communicate with another wireless terminal during this switching process, that is, after initiating signal strength detection of the downlink signal of another site, requesting registration in the other site because signal strength is sufficient, and until completing of the registration to the other site.

In consideration of the above circumstances, and an objective of the present disclosure is to suppress the shortage of channels that are allocatable to communications between wireless terminals while suppressing unnecessary switching of a repeater system at a wireless terminal.

SUMMARY

To achieve the objective, a repeater controller according to a first aspect of the present disclosure is a repeater controller for controlling a plurality of repeaters to each of which a unique channel is assigned, and that relay communications between a plurality of wireless terminals, the repeater controller including:

an allocator for, in response to a communication request from a first wireless terminal standing by in the channel of one of the plurality of repeaters with a second wireless terminal, allocating the channel of one of the plurality of repeaters to the first wireless terminal, and relays communications between the first wireless terminal and the second wireless terminal to the repeater having the allocated channel;

a determination unit for determining whether channels allocatable to the communications between the plurality of wireless terminals are short; and a switching controller for, when the determination unit has determined that the allocatable channels are short, controlling at least one controlling repeater among the plurality of repeaters that performs transmission and reception of a control signal to cause the controlling repeater to transmit, to a wireless terminal standing by in the channel of the controlling repeater, a switching signal designating standby in the channel of the controlling repeater that performs transmission and reception of a control signal among a plurality of repeaters controlled by another repeater controller.

It is preferable that the repeater controller further includes:

a determination result acquisition unit for acquiring a determination result indicating whether the allocatable channels are short, wherein when the determination unit has determined that the allocatable channels are short, and the determination result acquired by the determination result acquisition unit indicates that the allocatable channels are not short, the switching controller controls at least one controlling repeater to cause the controlling repeater to transmit the switching signal to the wireless terminal standing by in the channel of the controlling repeater.

It is preferable that when an allowance ratio indicative of a ratio of allocatable channels in the channels for communication is equal to or less than a first threshold value, the determination unit determines that the allocatable channels are short.

It is preferable that when a total of a quantity of the wireless terminals standing by on channel of the at least one controlling repeater is equal to or greater than a second threshold value, the determination unit determines that the allocatable channels are short.

A repeater system according to a second aspect of the present disclosure includes:
  any one of the aforementioned repeater controllers; and
  a plurality of repeaters to each of which a unique channel is assigned, and that relay communications between a plurality of wireless terminals and are controlled by the repeater controller.

A multisite trunking system according to a third aspect of the present disclosure includes:
  a wireless terminal;
  a slave site that is the aforementioned repeater system; and
  a master site for serving as a repeater system including a plurality of repeaters to each of which a unique channel is assigned, and relaying communications between a plurality of wireless terminals, and a repeater controller that controls the plurality of repeaters,
  wherein the repeater controller included in the repeater system serving as the master site includes:
    an allocator for, in response to a communication request from a first wireless terminal standing by in the channel of one of the plurality of repeaters with a second wireless terminal, allocating the channel of one of the plurality of repeaters to communications between the first wireless terminal and the second wireless terminal, and allowing relaying communications between the first wireless terminal and the second wireless terminal to the repeater having the allocated channel.

A site switching method according to a fourth aspect of the present disclosure is a site switching method to be performed by a repeater controller for controlling a plurality of repeaters to each of which a unique channel is assigned, and that relay communications between a plurality of wireless terminals, the method including:
  determining whether channels allocatable to the communications between the plurality of wireless terminals are short; and
  when it is determined that the allocatable channels are short, controlling at least one controlling repeater among the plurality of repeaters that performs transmission and reception of a control signal to cause the controlling repeater to transmit, to a wireless terminal standing by in the channel of the controlling repeater, a switching signal designating standby in the channel of the controlling repeater that performs transmission and reception of a control signal, among a plurality of repeaters controlled by another repeater controller.

A non-transitory computer readable medium according to a fifth aspect of the present disclosure is a non-transitory computer readable medium storing a program for allowing a computer to function as a repeater controller for controlling a plurality of repeaters to each of which a unique channel is assigned, and that relay communications between a plurality of wireless terminals, the program allowing the computer to function as:
  an allocator for, in response to a communication request from a first wireless terminal standing by in the channel of one of the plurality of repeaters with a second wireless terminal, allocating the channel of one of the plurality of repeaters to communications between the first wireless terminal and the second wireless terminal, and relays communications between the first wireless terminal and the second wireless terminal to the repeater having the allocated channel;
  a determination unit for determining whether channels allocatable to the communications between the plurality of wireless terminals are short; and
  a switching controller for, when the determination unit has determined that the allocatable channels are short, controlling at least one controlling repeater among the plurality of repeaters that performs transmission and reception of a control signal to cause the controlling repeater to transmit, to a wireless terminal standing by in the channel of the controlling repeater, a switching signal designating standby in the channel of the controlling repeater that performs transmission and reception of a control signal among a plurality of repeaters controlled by another repeater controller.

According to the present disclosure, upon determination that allocatable channels are short, a switching signal is transmitted to a wireless terminal standing by in the channel of a controlling repeater, the switching signal designating standby in the channel of a controlling repeater that is controlled by another repeater controller, thereby enabling suppression of the shortage of channels allocatable to communications between wireless terminals while suppressing unnecessary switching of the repeater system at the wireless terminal.

DETAILED DESCRIPTION OF THE PREFERRED EMBODIMENT

Figure 1:
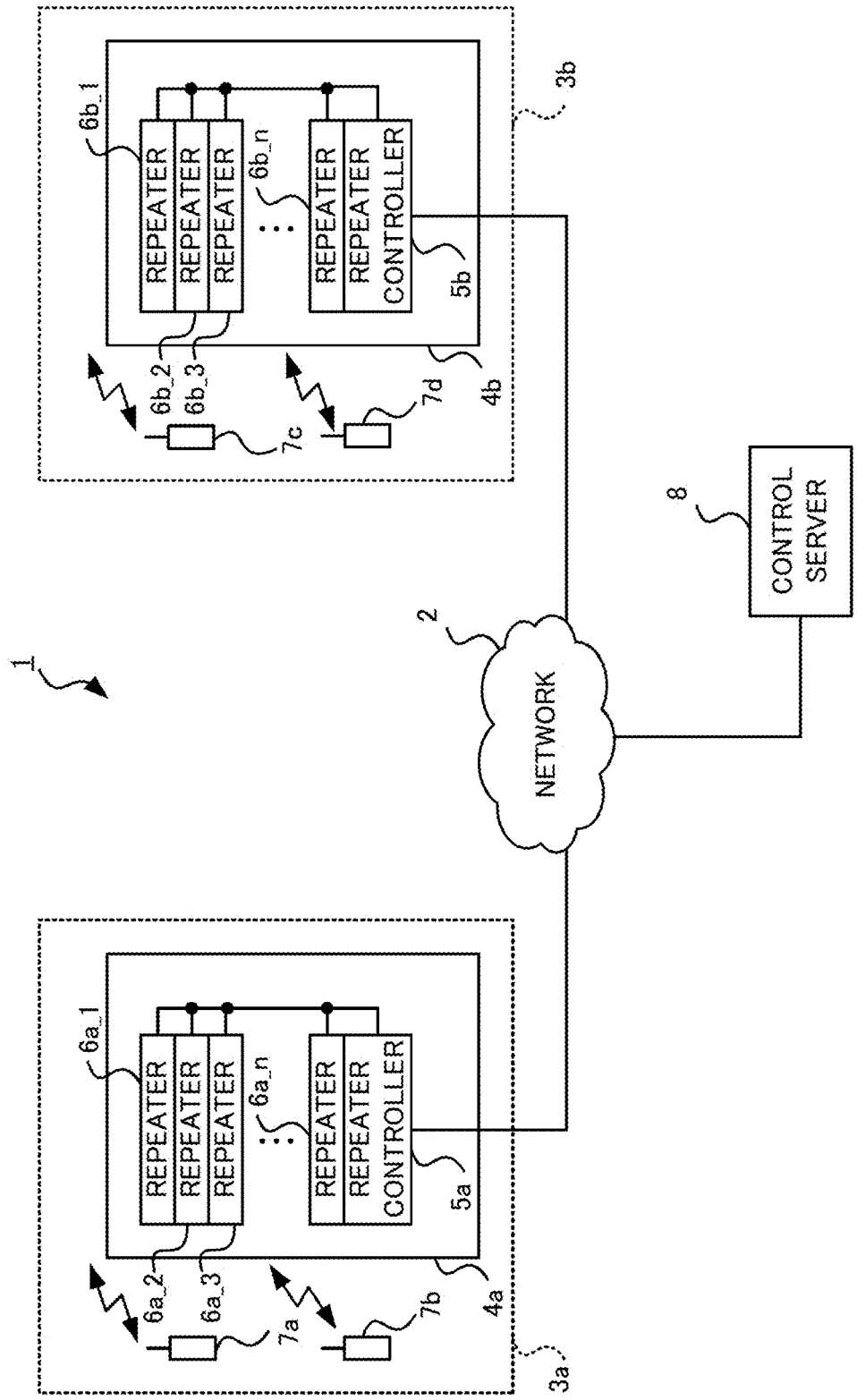
FIG. 1 is a block diagram illustrating a configuration example of a multisite trunking system according to Embodiment 1 of the present disclosure.

The following describes embodiments of the present disclosure with reference to the accompanying drawings in which same reference numerals are given to same or corresponding components.

Embodiment 1

FIG. 1 is a block diagram illustrating a configuration example of a multisite trunking system according to Embodiment 1 of the present disclosure. A multisite trunking system 1 includes repeater systems 4a, 4b connected over a network 2. The repeater system 4a includes a repeater controller 5a and repeaters 6a_1, 6a_2, 6a_3, ..., 6a_n. The repeater system 4b includes a repeater controller 5b and repeaters 6b_1, 6b_2, 6b_3, ..., 6b_n. The repeater controller 5a controls the repeaters 6a_1, 6a_2, 6a_3, ..., 6a_n. The repeater controller 5b controls the repeaters 6b_1, 6b_2, 6b_3, ..., 6b_n. In the example of FIG. 1, wireless terminals 7a, 7b are located in a coverage area 3a of the repeater system 4a, and wireless terminals 7c, 7d are located in a coverage area 3b of the repeater system 4b.

In the following description, a coverage area 3 refers to an arbitrary coverage area in the coverage areas 3a and 3b, a repeater system 4 refers to an arbitrary repeater system in the repeater systems 4a and 4b, and a repeater controller 5 refers to an arbitrary repeater controller in the repeater controllers 5a and 5b. A repeater 6a refers to an arbitrary repeater among the repeaters 6a_1, 6a_2, 6a_3, ..., 6a_n, and a repeater 6b refers to any repeater among the repeaters 6b_1, 6b_2, 6b_3, ..., 6b_n. In addition, a repeater 6 refers to any repeater in the repeaters 6a and 6b. A wireless terminal 7 refers to an arbitrary wireless terminal among the wireless terminals 7a, 7b, 7c, and 7d. A unique channel is assigned to each repeater 6. The repeater 6 relays communications between wireless terminals 7. A channel allocated to each repeater 6 is preferably a unique channel in the entire multisite trunking system 1. However, when the coverage areas 3a and 3b are set sufficiently apart so as not to cause crosstalk, for example, a frequency of the channel allocated to the repeater 6a and a frequency of the channel allocated to the repeater 6b may overlap each other.

The multisite trunking system 1 may be of either a dedicated control type or a distributed control type. In the case of the dedicated control type, the channel of one repeater 6 among repeaters 6 in each of the repeater systems 4 is allocated as a control channel. For example, the wireless terminal 7a requests registration to the repeater 6a, which serves as the control channel of the repeater system 4a, and the repeater controller 5a performs registration of the wireless terminal 7a to the repeater system 4a. Thereafter, the wireless terminal 7a stands by on the control channel, and at the time of communication, the wireless terminal 7a shifts to a communication channel that is the channel of another repeater 6a to perform communication according to a control signal transmitted through the control channel.

In the case of the distributed control type, one repeater 6 among repeaters 6 constituting the repeater system 4 is assigned as a collector repeater. For example, the wireless terminal 7a requests registration to the repeater 6a assigned as the collector repeater, and this repeater 6a registers the wireless terminal 7a to the repeater system 4a, and assigns one repeater 6a as a home repeater of the wireless terminal 7a. Thereafter, the wireless terminal 7a stands by in the channel of the home repeater, and at the time of communication, the wireless terminal 7a moves to a communication channel that is the channel of another repeater 6a to perform communication according to the control signal transmitted from the home repeater.

The multisite trunking system 1 includes a repeater system 4 serving as a master site and a repeater system 4 serving as a slave site. For example, the repeater system 4a operates as a master site, and the repeater system 4b operates as a slave site. The repeater system 4b operating as a slave site determines whether the channels allocatable to communications between wireless terminals 7 are short. At least one repeater 6 is a controlling repeater that transmits and receives a control signal. A repeater 6 serving as a controlling repeater is the repeater 6 that becomes a control channel in the case of a dedicated control type, and is the repeater 6 that becomes a home repeater in the case of a distributed control type. For example, upon determination that allocatable channels are short, the repeater system 4b transmits a switching signal designating standby in the repeater system 4a from the repeater 6b, serving as a controlling repeater, to the wireless terminal 7c, 7d standing by in the channel of the repeater 6b. When channels are short in the repeater system 4b operating as a slave site, the wireless terminal 7c, 7d standing by is urged to stand by in the channel of the repeater system 4a, so that it is possible to suppress the shortage of the channels allocatable to the communications between wireless terminals 7 in the repeater system 4b while suppressing unnecessary switching of the repeater system 4 in the wireless terminal 7c, 7d.

With the multisite trunking system 1 of a dedicated control type taken as an example, the operation of each component of the multisite trunking system 1 is described below. A description is given below of an example where the wireless terminal 7a (first wireless terminal) requests communication with the wireless terminal 7c (second wireless terminal). As shown in FIG. 1, the wireless terminal 7a is registered in the repeater system 4a, and the wireless terminal 7c is registered in the repeater system 4b. The wireless terminal 7a requests the repeater 6a serving as a control channel to communicate with the wireless terminal 7c, and the repeater 6a sends a communication request from the wireless terminal 7a to the repeater controller 5a. Since the wireless terminal 7c is not registered to the repeater system 4a, the repeater controller 5a transmits a communication request to a control server 8. The control server 8 transfers the communication request to the repeater controller 5b of the repeater system 4b. Since the wireless terminal 7c is registered to the repeater system 4b, the repeater controller 5b transmits an acknowledgment (ACK) request to the wireless terminal 7c. Upon receiving the ACK from the wireless terminal 7c, the repeater controller 5b transfers the ACK to the control server 8, and allocates a communication channel to the wireless terminal 7c. The control server 8 transfers the received ACK to the repeater controller 5a. Upon receiving the ACK, the repeater controller 5a allocates a communication channel to the wireless terminal 7a. As a result, communications between the wireless terminals 7a and 7c are enabled.

Figure 2:
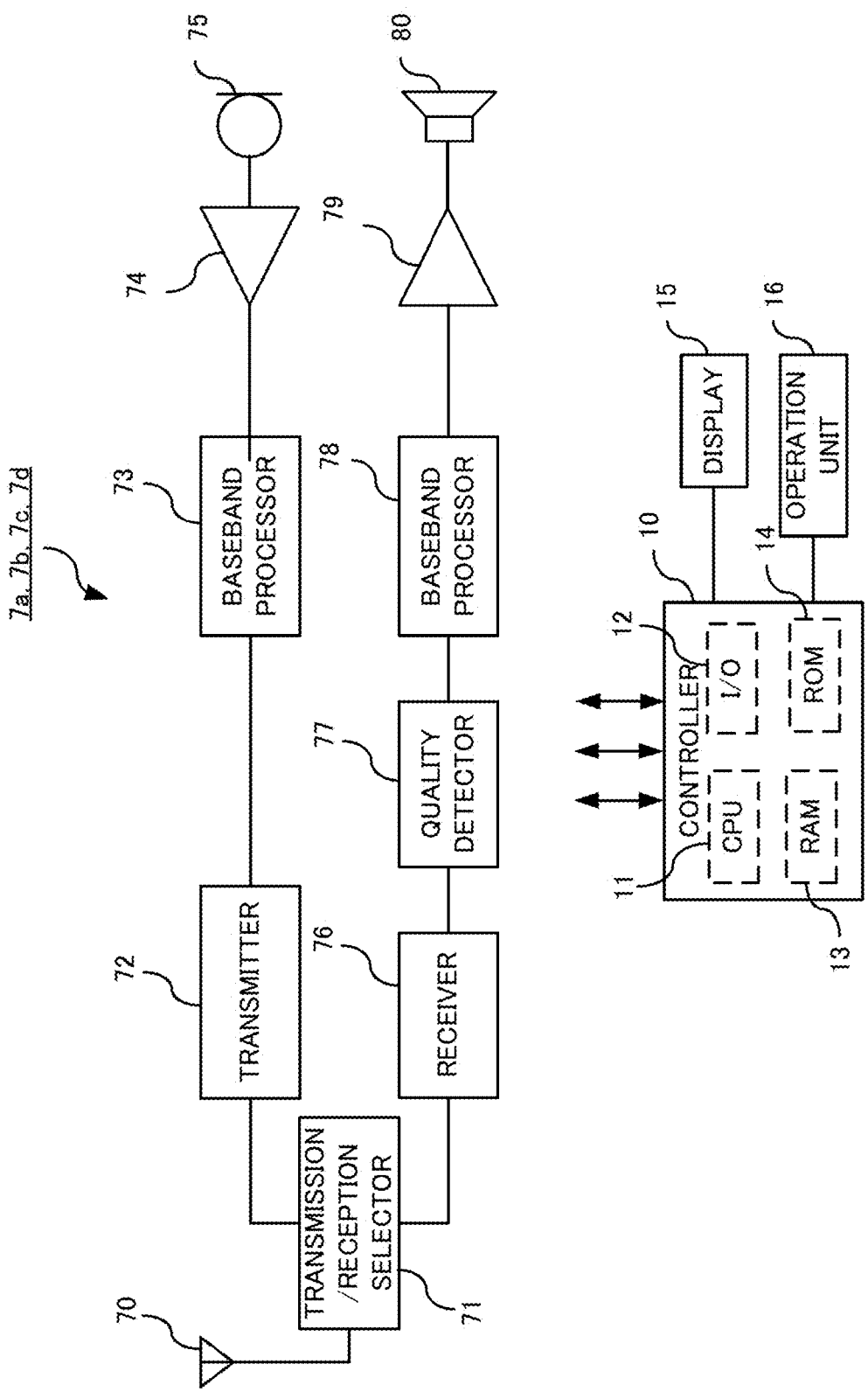
FIG. 2 is a block diagram illustrating a configuration example of a wireless terminal according to Embodiment 1.

FIG. 2 is a block diagram illustrating a configuration example of the wireless terminal according to Embodiment 1. Each of the wireless terminals 7 (7a, 7b, 7c, 7d) includes an antenna 70, a transmission/reception selector 71, a transmitter 72, a baseband processor 73, an analog-to-digital (A-D) converter 74, a microphone 75, a receiver 76, a quality detector 77, a baseband processor 78, a digital-to-analog (D-A) converter 79, a speaker 80, a controller 10, a display 15, and an operation unit 16. The controller 10 includes a central processing unit (CPU) 11, a random access memory (RAM) 13, and a read-only memory (ROM) 14.

To avoid complication and to facilitate understanding, signal lines to the individual components are omitted from the controller 10. The controller 10 is connected to each component of the wireless terminal 7 via an input/output (I/O) 12, and controls the initiation, termination and contents of processing of each component. The CPU 11 runs a control program stored in the ROM 14 to control the wireless terminal 7. Also, commands and data input from the operation unit 16 via the I/O 12 and data obtained from the baseband processor 78 via the I/O 12 are processed and temporarily stored in the RAM 13, and the commands and data stored as needed are displayed onto a display 15, which is constituted by a liquid crystal display (LCD) or the like.

When a calling operation is performed through the operation unit 16 and communications between wireless terminals 7 are established in accordance with the above procedures, the wireless terminal 7 enters a transmission mode. When the wireless terminal 7 is in transmission mode, the microphone 75 outputs an analog audio signal to the A-D converter 74 according to the audio input. The A-D converter 74 performs analog to digital conversion of the audio signal from the microphone 75, and outputs the digital signal to the baseband processor 73. The baseband processor 73 generates a communication frame of a predetermined format based on the data of the audio signal from the A-D converter 74 or the data stored in the RAM 13 of the controller 10, and outputs the communication frame to the transmitter 72. The transmitter 72 modulates the communication frame generated by the baseband processor 73, and transmits the modulated communication frame to the repeater 6 via the transmission/reception selector 71 and the antenna 70. The modulation scheme used in the transmitter 72 may be, for example, Gaussian filtered minimum shift keying (GMSK), phase shift keying (PSK), quadrature amplitude modulation (QAM), frequency shift keying (FSK) or the like.

A description is given below of a case where the wireless terminal 7 is in a standby state or in a state where communication is established between wireless terminals 7 in accordance with the above procedures so that the communication is being received, that is, a case where the wireless terminal 7 is in the reception mode. When a radio signal is transmitted from the repeater 6, the receiver 76 receives the radio signal from the repeater 6 via the antenna 70 and the transmission/reception selector 71. The receiver 76 amplifies the received signal, performs signal processing such as demodulation process to generate a demodulated signal, and outputs the demodulated signal to the quality detector 77. The quality detector 77 detects, for example, a received signal strength indicator (RSSI) of the demodulated signal, and determines the communication quality of the channel that has received the radio signal. In addition to the RSSI, the quality detector 77 may determine the communication quality using a bit error rate (BER) or a message error rate (MER). The quality detector 77 outputs the demodulated signal to the baseband processor 78. Note that the quality detector 77 may be provided as a part of the function of the baseband processor 78.

The baseband processor 78 extracts a communication frame from the demodulated signal and transmits the communication frame and outputs the information of the header part of the frame to the CPU 11. The CPU 11 analyzes the information of the header part. When the transmission destination is the local device, the CPU 11 causes the baseband processor 78 to output the data of the audio signal included in the data part of the communication frame to the D-A converter 79, and causes the RAM 13 to temporarily store data other than the audio signal, included in the data part of the communication frame, and causes the display 15 to display the data as needed. The D-A converter 79 performs digital to analog conversion of the data of the audio signal, and outputs the analog data to the speaker 80. The speaker 80 outputs the analog-converted data.

Figure 3:
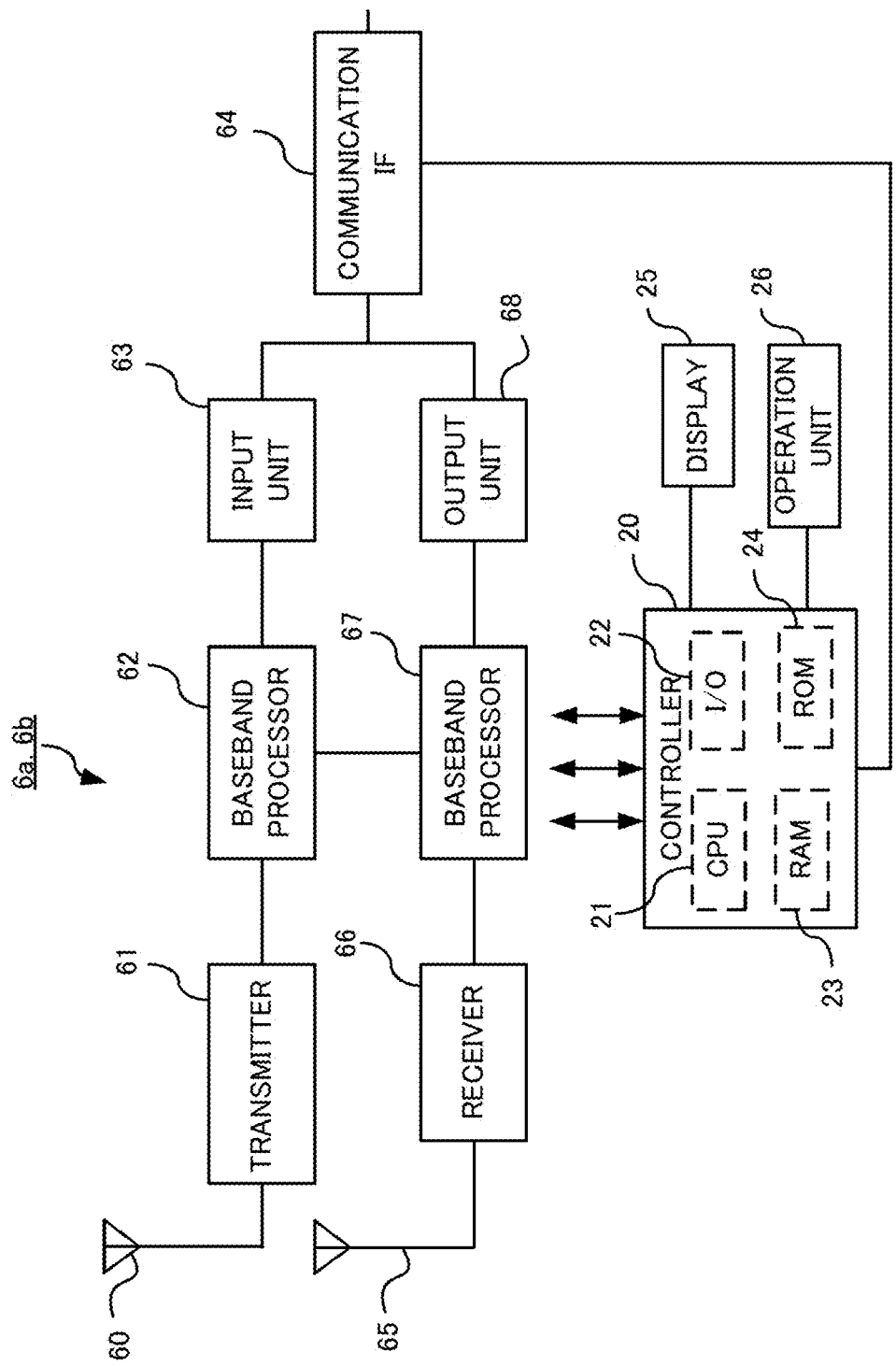
FIG. 3 is a block diagram illustrating a configuration example of a repeater according to Embodiment 1.

FIG. 3 is a block diagram illustrating a configuration example of the repeater according to Embodiment 1. The repeater 6 (6a, 6b) performs signal processing, such as amplification or wave-shaping, on the radio signal received from the wireless terminal 7, and transfers the radio signal subjected to signal processing to the repeater controller 5. The repeater 6 also generates a radio signal based on the data acquired from the repeater controller 5, and transmits the radio signal to the wireless terminal 7. The repeater 6 includes a transmission antenna 60, a transmitter 61, a baseband processor 62, an input unit 63, a communication interface (IF) 64, a reception antenna 65, a receiver 66, a baseband processor 67, an output unit 68, a controller 20, a display 25, and an operation unit 26. Like the controller 10 shown in FIG. 2, the controller 20 includes a CPU 21, a RAM 23, and a ROM 24. The controller 20 communicates with each of the repeater controller 5 and the control server 8 via the communication IF 64. The controller 20 is connected to each component of the repeater 6 via an I/O 22, and controls the initiation, termination and contents of the processing of each component.

After communications between the wireless terminals 7 are established in accordance with the above procedures, the repeater 6 relays the communications between the wireless terminals 7. The receiver 66 receives the radio signal from the wireless terminal 7 via the reception antenna 65. The receiver 66 amplifies the received signal, performs signal processing such as demodulation process to generate a demodulated signal, and outputs the demodulated signal to the baseband processor 67. The baseband processor 67 extracts a communication frame from the demodulated signal. The output unit 68 outputs the extracted communication frame to the repeater controller 5 via the communication IF 64. The repeater controller 5 receives the communication frame, and transfers the communication frame to the control server 8. The control server 8 receives the communication frame, and transfers the communication frame to all of the repeater controllers 5.

Each of the repeater controllers 5 having received the communication frame from the control server 8 determines whether the wireless terminal 7 as the transmission destination of the communication frame is registered in the repeater system 4 having the local device. When the destination wireless terminal 7 is registered in the repeater system 4 having the local device, the repeater controller 5 transmits the communication frame to the repeater 6 having the channel allocated to the communication of the wireless terminal 7. The input unit 63 included in the repeater 6 receives the communication frame transmitted from the repeater controller 5 via the communication IF 64, and outputs the communication frame to the baseband processor 62. The baseband processor 62 performs necessary processing, and outputs the communication frame to the transmitter 61. The transmitter 61 modulates the communication frame to generate a radio signal, and transmits the radio signal from the transmission antenna 60 to the wireless terminal 7 of the transmission destination. The modulation scheme used by the transmitter 61 is, for example, GMSK, PSK, QAM, FSK, or the like.

When the wireless terminal 7 performs communication via the repeater 6, the uplink, which is a communication from the wireless terminal 7 to the repeater 6, and the downlink, which is a communication from the repeater 6 to the wireless terminal 7, are carried out simultaneously using different frequencies or different time slots. Therefore, the repeater 6 includes the transmission antenna 60 and the reception antenna 65.

Figure 4:
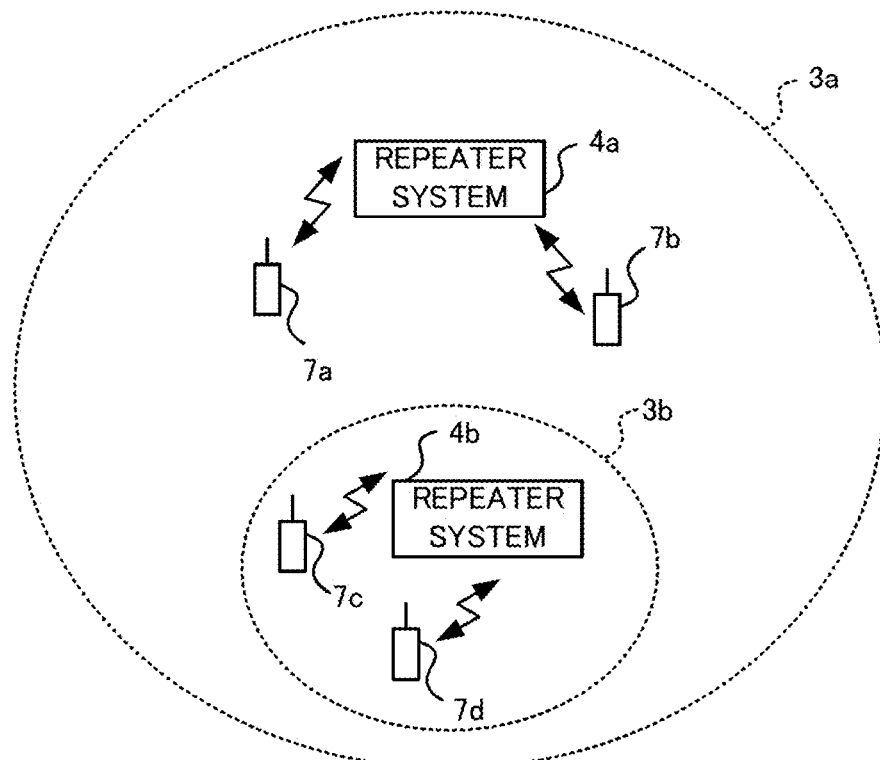
FIG. 4 is a diagram illustrating an example of a coverage area according to Embodiment 1.

FIG. 4 is a diagram illustrating an example of a coverage area according to Embodiment 1. In the example of FIG. 4, the coverage area 3a of the repeater system 4a has a dead zone in which the signal quality deteriorates due to the undulation of the terrain or the influence of buildings, for example. To enable communication in the dead zone, the repeater system 4b having the dead zone as the coverage area 3b is provided. That is, in the example of FIG. 4, the repeater system 4a operates as a master site, and the repeater system 4b as a slave site.

Figure 5:
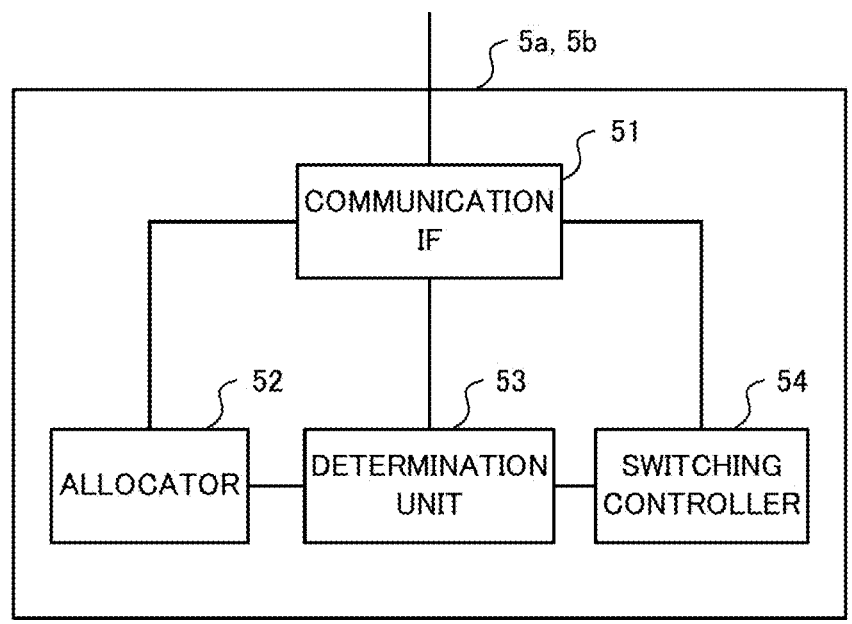
FIG. 5 is a block diagram illustrating a configuration example of a repeater controller according to Embodiment 1.

FIG. 5 is a block diagram illustrating a configuration example of the repeater controller according to Embodiment 1. In Embodiment 1, the repeater controller 5 (5a, 5b) has two operation modes, as a master site and as a slave site. The operation mode is set by the control server 8. The repeater controller 5 includes a communication IF 51, an allocator 52, a determination unit 53, and a switching controller 54. The allocator 52, the determination unit 53, and the switching controller 54 communicate with each of the repeater 6 and the control server 8 via the communication IF 51. As described above, the allocator 52 performs transmission and reception of a communication request with respect to the control server 8, and transmits an ACK request to, and receives ACK from, the wireless terminal 7. Upon reception of the ACK transmitted by the wireless terminal 7, the allocator 52 allocates the channel of the repeater 6 to be controlled as the communication channel of the wireless terminal 7. Further, when the ACK transmitted from the wireless terminal 7 as the transmission destination of the communication request is received from the control server 8, the allocator 52 allocates the channel of the repeater 6 to be controlled as the communication channel of the wireless terminal 7 that has made the communication request.

When the operation mode is the slave site, the determination unit 53 determines whether channels allocatable to communications between wireless terminals 7 are short. For example, when an allowance ratio indicating the ratio of the channels allocatable to communications between wireless terminals 7, among the communication channels, is equal to or less than a first threshold value, the determination unit 53 determines that the allocatable channels are short. When the multisite trunking system 1 is of a dedicated control type and the repeater system 4a has 32 repeaters 6a, the determination unit 53 included in the repeater controller 5a calculates, as the allowance ratio, a value obtained by dividing the number of channels that are not allocated to the communications between the wireless terminals 7 by the allocator 52 by the number of the channels excluding the control channel, for example, 31.

The determination unit 53 determines the sum of the number of the wireless terminals 7 standing by on the control channel is equal to or greater than a second threshold value, the determination unit 53 may determine that the allocatable channels are short. The first threshold value and the second threshold value may be determined in the multisite trunking system 1 according to an allowable standby rate or a loss probability. A method of determining whether allocatable channels are short is not limited to the above example. For example, the determination unit 53 may determine that the allocatable channels are short in a predetermined time period or on a predetermined day of the week. This determination method is effective when it is known in advance that the number of users using the wireless terminals 7 in a predetermined time period or on a predetermined day of the week is greater than that in other time periods or other days of the week. The determination unit 53 may combine the aforementioned methods of determining whether the allocatable channels are short. For example, when the allowance ratio is equal to or less than the first threshold value and the sum of the numbers of the wireless terminals 7 standing by on the control channel is equal to or greater than the second threshold value, the determination unit 53 may determine that the allocatable channels are short. Alternatively, for example, when the allowance ratio is equal to or less than the first threshold value or when the sum of the numbers of the wireless terminals 7 standing by on the control channel is equal to or greater than the second threshold value, the determination unit 53 may determine that the allocatable channels are short.

When the determination unit 53 determines that the allocatable channels are short, the switching controller 54 controls the repeater 6, serving as a controlling repeater, to transmit, from this repeater 6 to the wireless terminal 7 standing by in the channel of the repeater 6, a switch signal designating standby in the channel of a repeater 6 serving as a controlling repeater, which is controlled by another repeater controller 5. In the dedicated control type multisite trunking system 1, the switching controller 54 included in the repeater system 4 controls the repeater 6 to be the control channel to transmit a switching signal designating standby in the channel of the repeater 6 to be the control channel of another repeater system 4. The switching signal designates standby in the channel of the repeater 6 to be the control channel of the other repeater system 4, that is, designates registration to the other repeater system 4. In the distributed control type multisite trunking system 1, the switching controller 54 controls the repeater 6, serving as a home repeater, to transmit a switching signal. For example, the switching controller 54 uses a Vote Now signal specified in the European Telecommunications Standards Institute (ETSI) TS 102 658 as the switching signal. The Vote Now signal includes a control channel of another repeater system 4 and a code indicating whether the repeater system 4 is a master site or a slave site. For example, in the dedicated control type multisite trunking system 1, the switching controller 54 included in the repeater controller 5 controls the repeater 6 to be the control channel to broadcast the switching signal to all the wireless terminals 7 registered to the repeater system 4.

In the examples of FIGS. 1 and 4, the operation mode of the repeater controller 5a is the master site, and the operation mode of the repeater controller 5b is the slave site. When the determination unit 53 of the repeater controller 5b determines that the allocatable channels are short, the switching controller 54 transmits a signal designating transmission of a switching signal to the repeater 6b to be the control channel, so that the repeater 6b transmits a switch signal designating standby in the control channel of the repeater system 4a to the wireless terminals 7c, 7d standing by in the channel of the repeater 6b.

The operation of the wireless terminal 7 that has received the switching signal is described below. When the CPU 11 analyzes the information of the header part acquired from the baseband processor 78, and detects the reception of the switching signal, the CPU 11 changes the reception frequency to the frequency of the control channel of another repeater system 4 specified by the switching signal. When the change of the reception frequency is completed, the wireless terminal 7 receives the radio signal through the control channel of the other repeater system 4. The quality detector 77 detects the communication quality of the radio signal, for example, RSSI. When the other repeater system 4 specified by the switching signal is the master site and the RSSI of the radio signal is equal to or greater than a third threshold value, the quality detector 77 determines that the communication quality of the control channel of the other repeater system 4 is sufficient. The third threshold value may be determined according to the characteristics of the wireless terminal 7. When the other repeater system 4 is the master site and the quality detector 77 determines that the communication quality is sufficient, the wireless terminal 7 requests registration to the other repeater system 4, and stands by on the control channel of that repeater system 4. That is, the wireless terminal 7 shifts the standby channel. When the quality detector 77 determines that the communication quality is insufficient, the CPU 11 returns the reception frequency to the frequency of the original standby channel. That is, the wireless terminal 7 does not shift the standby channel.

When another repeater system 4 specified by the switching signal is a slave site and the communication quality of the control channel of the other repeater system 4 is higher than the communication quality of the control channel of the repeater system 4 currently standing by, for example, when the RSSI of the radio signal received on the control channel of the other repeater system 4 is larger than the RSSI of the radio signal received by the control channel of the repeater system 4 that is currently standing by, the quality detector 77 determines that the communication quality of the control channel of the other repeater system 4 is sufficient. In a case where the other repeater system 4 is a slave site and the quality detector 77 determines that the communication quality is sufficient, the wireless terminal 7 requests registration to the other repeater system 4, and stands by on the control channel of the repeater system 4. That is, the wireless terminal 7 shifts the standby channel. When the quality detector 77 determines that the communication quality is insufficient, the CPU 11 returns the reception frequency to the frequency of the original standby channel. That is, the wireless terminal 7 does not shift the standby channel.

In addition to the case where the switching signal is received from the repeater 6 as described above, the wireless terminal 7 detects the communication quality of the control channel of the standing-by repeater system 4 at specified intervals, and when the communication quality is deteriorated, shifting the standby channel is attempted. The quality detector 77 detects the communication quality, for example, RSSI, of the radio signal received through the control channel of the standing-by repeater system 4. When the RSSI of the radio signal is equal to or greater than a fourth threshold value, the quality detector 77 determines that the communication quality is sufficient. When the quality detector 77 determines that the communication quality is sufficient, the wireless terminal 7 continues to stand by on the same control channel. The fourth threshold value can be determined according to the characteristics of the wireless terminal 7.

When the RSSI of the radio signal is less than the fourth threshold value, the quality detector 77 determines that the communication quality of the current standby channel is not sufficient. When the quality detector 77 determines that the communication quality of the current standby channel is not sufficient, the wireless terminal 7 receives the radio signal through the control channel of another determined repeater system 4. The control channel of the determined another repeater system 4 is the control channel of the other repeater system 4 set in the wireless terminal 7 in advance. The quality detector 77 detects the RSSI of the radio signal. When the RSSI of the radio signal is equal to or greater than the fourth threshold value, the quality detector 77 determines that the communication quality of the control channel of the determined another repeater system 4 is sufficient. When the quality detector 77 determines that the communication quality of the control channel of the determined another repeater system 4 is sufficient, the wireless terminal 7 requests registration to the other repeater system 4, and stands by on the control channel of this repeater system 4. That is, the wireless terminal 7 shifts the standby channel. When the quality detector 77 determines that the communication quality of the control channel of the other repeater system 4 is insufficient, the wireless terminal 7 does not shift the standby channel.

Although, in the above example, an attempt is made to shift the standby channel upon determination that the communication quality of the current standby channel is not sufficient, when the presently registered repeater system 4 serves as the slave site, shifting to the control channel of another repeater system 4 serving as the master site may be attempted periodically, regardless of the communication quality of the current standby channel.

Figure 6:
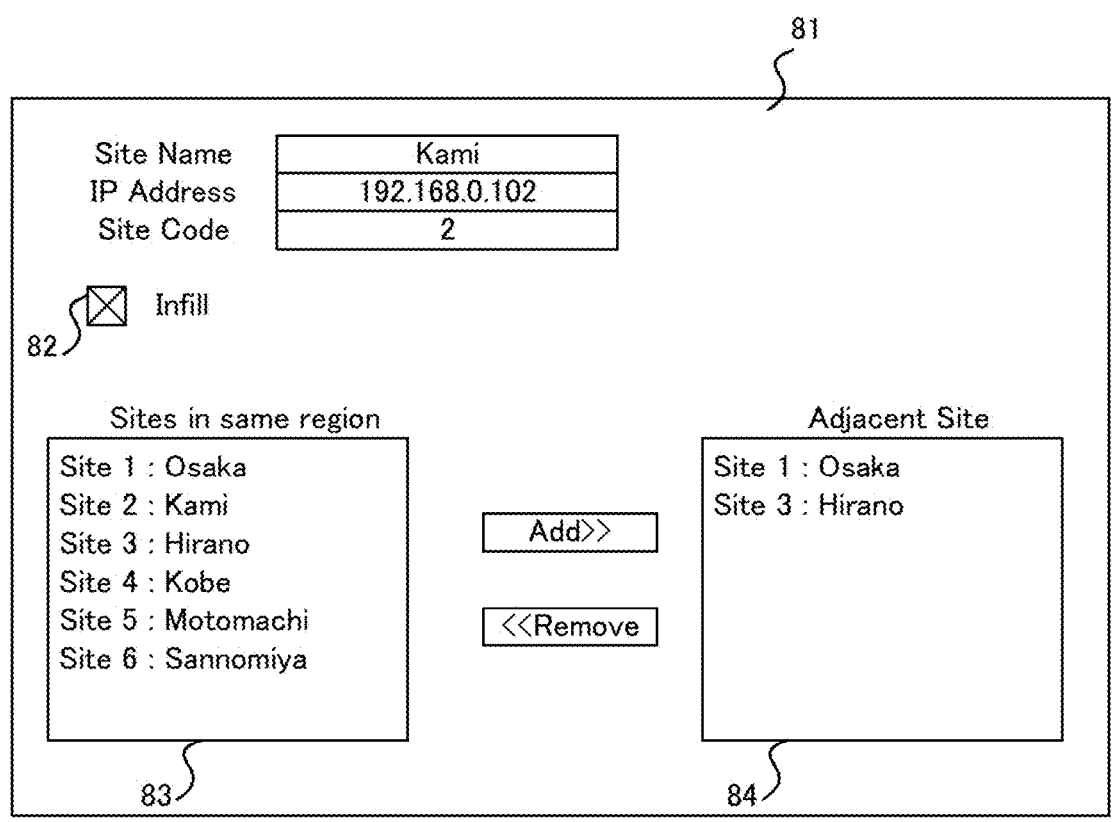
FIG. 6 is a diagram illustrating an example of a setting screen of a control server according to Embodiment 1.

FIG. 6 is a diagram illustrating an example of a setting screen of the control server according to Embodiment 1. Through an operation on the control server 8, settings may be made for operating the repeater system 4 as a master site or a slave site. A display screen 81 of the control server 8 is provided with a check box 82 for making settings for operation as a master site or a slave site. In the example of FIG. 6, the check box 82 is checked, and the target repeater system 4 operates as a slave site. The display screen 81 is provided with a list display part 83 showing the repeater systems 4 located in the same area as the target repeater system 4, for example, a geographical range such as Kansai, Kanto and Chubu. The display screen 81 is also provided with a target display part 84 for displaying candidates of another repeater system 4 specified by the switching signal. It is possible to select the repeater system 4 displayed on the list display part 83 and add it to the candidates of the other repeater system 4 that are specified by the switching signal and are displayed on the target display part 84. The display of the target display part 84 is effective only when the check box 82 is checked.

Suppose that a repeater system 4, serving as a slave site, is installed in the dead zone in the coverage area 3 of the repeater system 4 serving as a master site. In this case, it is possible to set, to the repeater system 4 serving as the slave site, the repeater system 4 serving as the master site as a candidate of another repeater system 4 specified by the switching signal. For example, there may also be dead zones in the coverage area 3 of the repeater system 4 serving as the master site. In this case, it is possible to set, to the repeater system 4 serving as the slave site, located in one dead zone, the repeater system 4, serving as the slave site, installed in another dead zone, as a candidate for another repeater system 4 specified by the switching signal.

Figure 7:
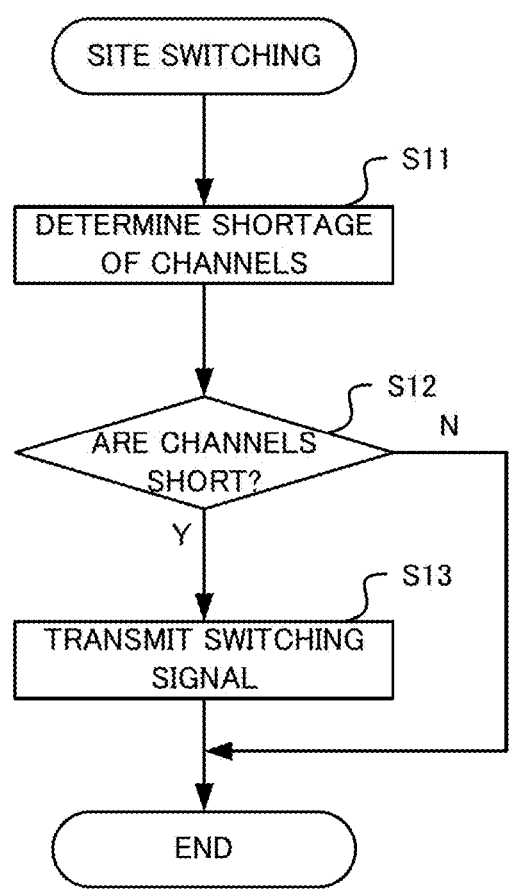
FIG. 7 is a flowchart illustrating an example of an operation of site switching performed by the repeater controller according to Embodiment 1.

FIG. 7 is a flowchart illustrating an example of an operation of site switching performed by the repeater controller according to Embodiment 1. The determination unit 53 included in the repeater controller 5 determines whether the channels allocatable to communications between wireless terminals 7 are short (step S11). When it is determined in step S11 that the allocatable channels are short (step S12; Y), the switching controller 54 controls at least one repeater 6 serving as a controlling repeater, among the repeaters 6 that are controlled by the repeater controller 5, to transmit a switching signal from the repeater 6 to the wireless terminal 7 standing by in the channel of the repeater 6 (step S13). When the process of step 13 is completed, the repeater controller 5 terminates the site switching. When it is determined in step S12 that the allocatable channels are not short (step S12; N), the repeater controller 5 terminates the site switching without performing the process of step S13. The repeater controller 5 repeatedly performs the site switching described above at specified intervals.

Figure 8:
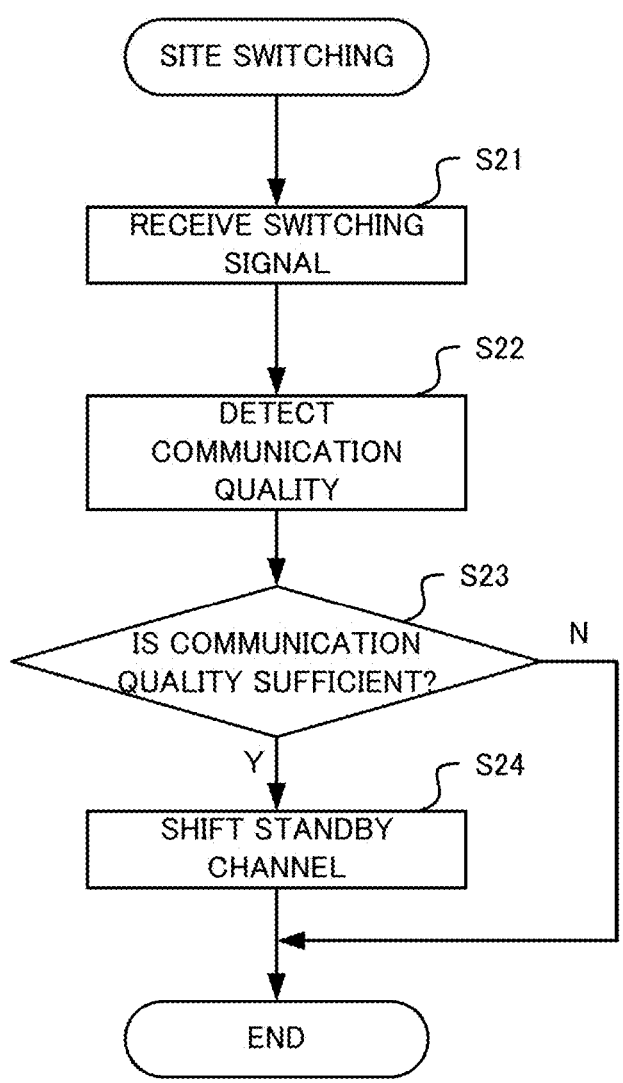
FIG. 8 is a flowchart illustrating an example of an operation of site switching performed by the wireless terminal according to Embodiment 1.

FIG. 8 is a flowchart illustrating an example of an operation of site switching performed by the wireless terminal according to Embodiment 1. The wireless terminal 7 receives a switching signal (step S21). The quality detector 77 detects the communication quality of the control channel of another repeater system 4 specified by the switching signal (step S22). When the quality detector 77 determines that the communication quality is sufficient (step S23; Y), the wireless terminal 7 shifts the standby channel (step S24). Upon completion of the process of step S24, the wireless terminal 7 terminates the site switching. When the quality detector 77 determines that the communication quality is not sufficient (step S23; N), the wireless terminal 7 terminates the site switching without performing the process of step S24. Upon each reception of the switching signal, the wireless terminal 7 performs the site switching described above.

Figure 9:
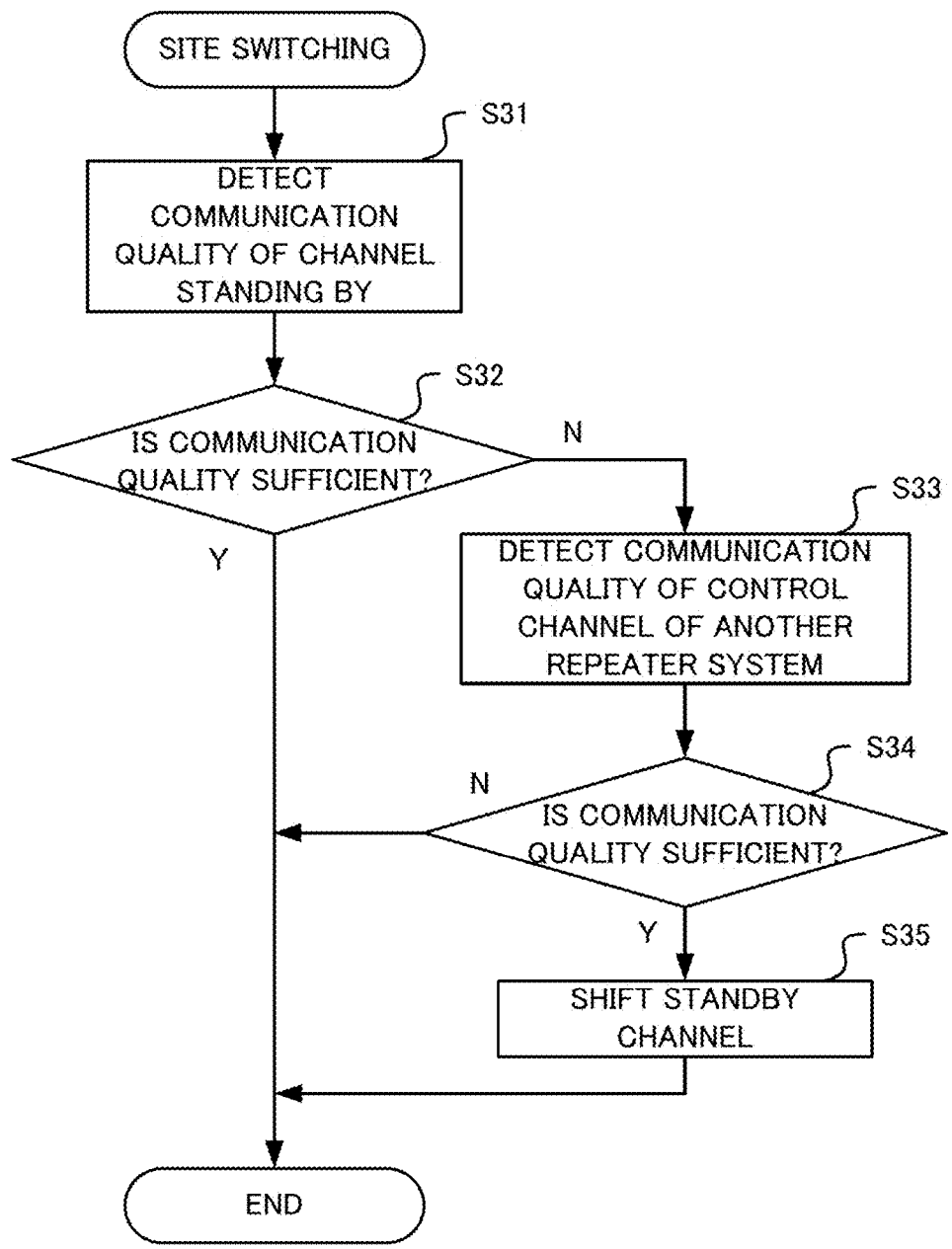
FIG. 9 is a flowchart illustrating another example of an operation of site switching performed by the wireless terminal according to Embodiment 1.

FIG. 9 is a flowchart illustrating another example of an operation of site switching performed by the wireless terminal according to Embodiment 1. In addition to the case where the switching signal is received as illustrated in FIG. 8, the wireless terminal 7 detects, at specified intervals, the communication quality of the control channel of the repeater system 4 that is currently standing by, and when the communication quality is deteriorated, the wireless terminal 7 may attempt to shift the standby channel. The quality detector 77 detects the communication quality of the control channel of the repeater system 4 (step S31). When the quality detector 77 determines that the communication quality is sufficient (step S32; Y), the wireless terminal 7 terminates the site switching. That is, the wireless terminal 7 continues to stand by on the same control channel.

When the quality detector 77 determines that the communication quality is insufficient (step S32; N), the wireless terminal 7 receives a radio signal through the control channel of another specified repeater system 4, and the quality detector 77 detects the communication quality of the control channel (step S33). When the quality detector 77 determines that the communication quality of the control channel of the other repeater system 4 is sufficient (step S34; Y), the wireless terminal 7 shifts the standby channel (step S35). Upon completion of the process of step S35, the wireless terminal 7 terminates the site switching. When the quality detector 77 determines that the communication quality of the control channel of the other repeater system 4 is not sufficient (step S34; N), the wireless terminal 7 terminates the site switching without performing the process of step S35. The wireless terminal 7 repeatedly performs the above-described site switching at specified intervals. It should be noted that the repeater controller 5 may repeatedly perform only the processes of steps S33 to S35 shown in FIG. 9 for the other repeater system 4 serving as the master site at specified intervals.

As described above, according to the multisite trunking system 1 of Embodiment 1 of the present disclosure, when the repeater controller 5 determines that the channels allocatable to communications between wireless terminals 7 are short, the repeater controller 5 controls the repeater 6 serving as a controlling repeater to transmit a switching signal to the wireless terminal 7 standing by in the channel of the repeater 6, thus ensuring suppression of the shortage of the channels allocatable to communications between wireless terminals 7 while suppressing unnecessary switching of the repeater system 4 in the wireless terminals 7.

Embodiment 2

Figure 10:
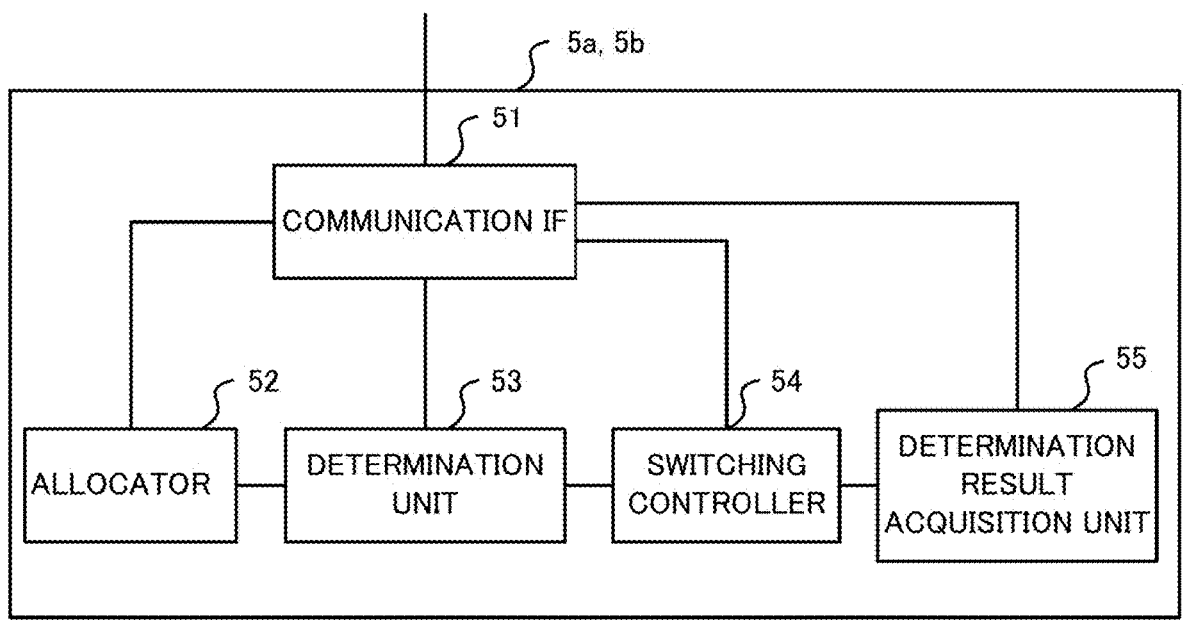
FIG. 10 is a block diagram illustrating a configuration example of a repeater controller according to Embodiment 2 of the present disclosure.

When a repeater controller 5 according to Embodiment 2 of the present disclosure determines that the channels allocatable to communications between wireless terminals 7 are short and channels allocatable to the communication of the wireless terminal 7 in a repeater system 4 having another repeater controller 5 are not short, the repeater controller 5 transmits a switching signal designating standby in the channel of the repeater 6 that transmits and receives a control signal and that is controlled by the other repeater controller 5. FIG. 10 is a block diagram illustrating a configuration example of the repeater controller according to Embodiment 2 of the present disclosure. The repeater controller 5 (5a, 5b) according to Embodiment 2 includes a determination result acquisition unit 55 in addition to the configuration of the repeater controller 5 according to Embodiment 1 shown in FIG. 5. The determination result acquisition unit 55 acquires, via the communication IF 51, the result of determination as to whether the allocatable channels are short, which is performed by the determination unit 53 included in the other repeater controller 5. The determination unit 53 also transmits the determination result to the other repeater controller 5 via the communication IF 51.

Based on the acquired determination result, the determination result acquisition unit 55 informs the switching controller 54 of whether the channels allocatable to communications between the wireless terminals 7 in the repeater system 4 having another repeater controller 5 are short.

When the determination unit 53 determines that the channels are short and the switching controller 54 is informed by the determination result acquisition unit 55 that channels allocatable to communications between wireless terminals 7 are not short in the repeater system 4 having another repeater controller 5, the switching controller 54 controls at least one repeater 6 serving as a controlling repeater to transmit a switching signal from the repeater 6 to the wireless terminal 7 standing by in the channel of the repeater 6. Since the switching signal is transmitted when the channels allocatable to another repeater system 4 are not short, shifting the standby channel of the wireless terminal 7 may suppress the shortage of channels allocatable to the other repeater system 4.

Figure 11:
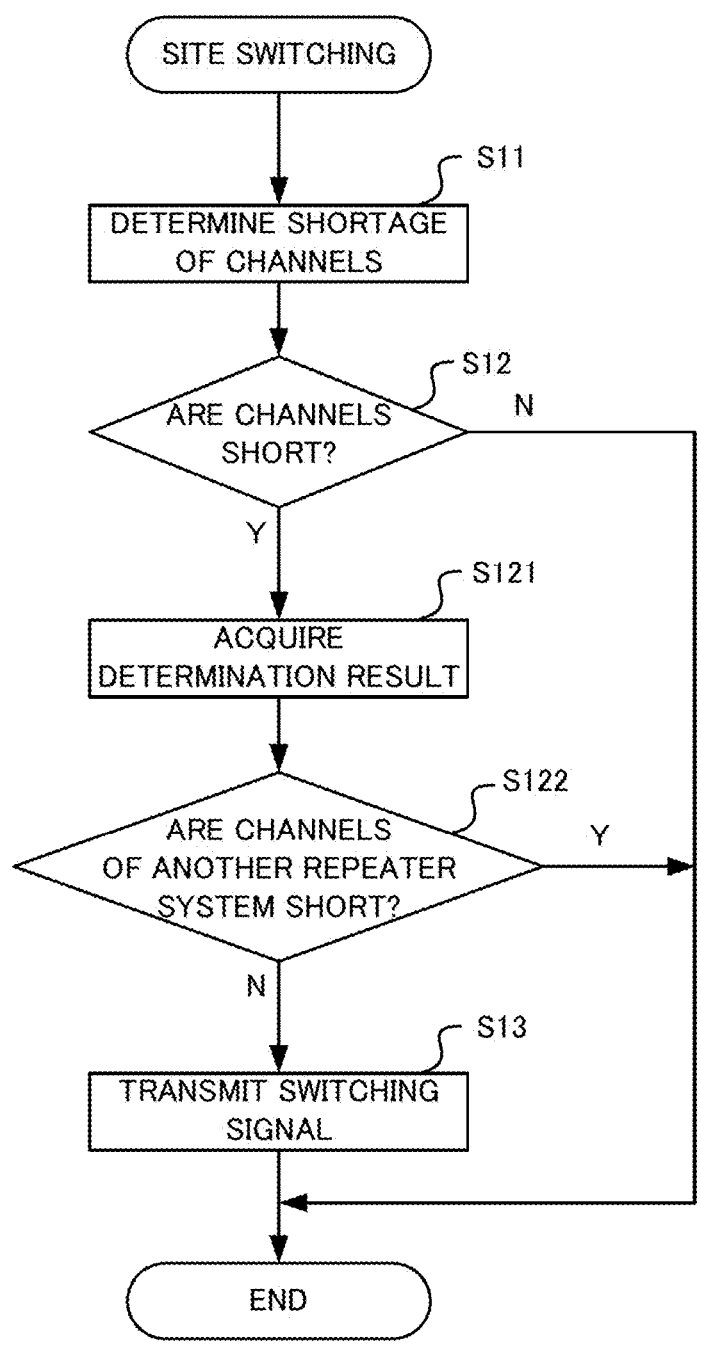
FIG. 11 is a flowchart illustrating an example of an operation of site switching performed by the repeater controller according to Embodiment 2.

FIG. 11 is a flowchart illustrating an example of an operation of site switching performed by the repeater controller according to Embodiment 2. The processes of steps S11, S12, and S13 are the same as the processes performed by the repeater controller 5 according to Embodiment 1 shown in FIG. 7. When it is determined in step S12 that the allocatable channels are short (step S12; Y), the determination result acquisition unit 55 acquires the determination result from the determination unit 53 included in another repeater controller 5 (step S121). When the channels allocatable to the repeater system 4 having another repeater controller 5 are not short (step S122; N), the switching controller 54 controls, among the repeaters 6 controlled by the repeater controller 5, at least one repeater 6 serving as a controlling repeater to transmit a switching signal from the repeater 6 to the wireless terminal 7 standing by in the channel of the repeater 6 (step S13). When the process of step 13 is completed, the repeater controller 5 terminates the site switching. When the channels allocatable to the repeater system 4 having another repeater controller 5 are short (step S122; Y), the repeater controller 5 terminates the site switching without performing the process of step S13. When it is determined in step S12 that the allocatable channels are not short (step S12; N), the repeater controller 5 terminates the site switching without performing the processes of steps S13, S121, and S122. The repeater controller 5 repeatedly performs the site switching described above at specified intervals. The site switching that is performed by the wireless terminal 7 is the same as the site switching performed in Embodiment 1.

As described above, according to the multisite trunking system 1 of Embodiment 2 of the present disclosure, when the channels allocatable to the other repeater system 4 are not short, the repeater controller 5 controls the repeater 6 serving as the controlling repeater to transmit a switching signal from the repeater 6 to the wireless terminal 7 standing by in the channel of the repeater 6, thereby ensuring suppression of the occurrence of shortage of channels allocatable to another repeater system 4, which is caused by the shifting of the standby channel of the wireless terminal 7.

Figure 12:
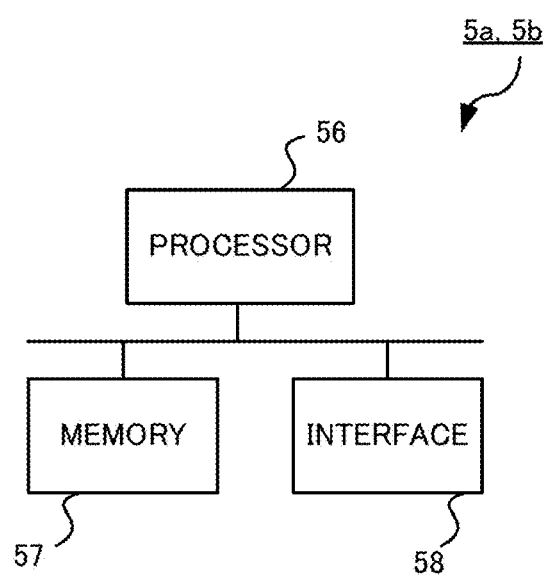
FIG. 12 is a diagram illustrating a configuration example of hardware of the repeater controllers according to embodiments of the present disclosure.

FIG. 12 is a diagram illustrating a configuration example of hardware of the repeater controllers according to embodiments of the present disclosure. The repeater controller 5 (5a, 5b) includes a processor 56 including a CPU and an internal memory, a memory 57 including a RAM and a flash memory, and an interface 58, as a hardware configuration for controlling each device. The individual functions of the repeater controller 5 are achieved by the processor 56 running a program stored in the memory 57. The interface 58 serves to connect the repeater controller 5 and an external device and establish communication with the repeater 6 and the control server 8, and may include plural kinds of interfaces 58 as needed. Although FIG. 12 illustrates an example where a single processor 56 and a single memory 57 are provided, processors 56 and memories 57 may cooperate to achieve the individual functions. Information specifying the operation mode may be stored in the memory 57.

In addition, the above hardware configurations and flowcharts are merely examples and may be arbitrarily modified and altered.

The central part for performing the control, including the processor 56, the memory 57, and the interface 58, maybe achieved by using a normal computer system, as well as a dedicated system. For example, the repeater controller 5 that executes the above-described processing may be achieved by storing a computer program for executing the above operations in a non-transitory computer-readable recording medium (flexible disk, CD-ROM, DVD-ROM or the like) for distribution, and loading the computer program onto a computer. Alternatively, the repeater controller 5 may be achieved by storing the computer program in a storage device included in a server device on a communication network, and downloading the computer program onto an ordinary computer system.

In a case where the functions of the repeater controller 5 are shared by the operating system (OS) and an application program or are achieved by the cooperation of the OS and the application program, for example, only the application program may be stored in a non-transitory recording medium or a storage device.

It is also possible to superimpose a computer program on a carrier wave and distribute the computer program over a communication network. For example, the computer program may be posted on a Bulletin Board System (BBS) on a communication network, and may be delivered over the communication network. Then, this computer program may be activated and run in the same manner as other application programs under the control of the OS so that the above-describe processing can be executed.

The embodiments of the present disclosure are not limited to those described above. In the above-described embodiments, the repeater controllers 5 have the same configuration, but the operations of the repeater controllers 5 vary according to the settings in the control server 8. The configuration of the repeater controller 5 is not limited to the above example; the operation mode of the repeater controller 5 may be switched according to a switch provided in the repeater controller 5. Also, the repeater controller 5 included in the repeater system 4, which serves as the master site, and the repeater controller 5 included in the repeater system 4, which is the slave site, may have different configurations. In this case, the repeater controller 5 included in the repeater system 4 serving as the master site has only the communication IF 51 and the allocator 52, whereas the repeater controller 5 included in the repeater system 4 serving as the slave site is the repeater controller 5 shown in FIG. 5. When the multisite trunking system 1 is of a distributed control type and the repeater system 4a has 32 repeaters 6a, the determination unit 53 included in the repeater controller 5a calculates, as the allowance ratio, a value obtained by dividing the number of channels that are not allocated to communications between wireless terminals 7 by the allocator 52 by the number of the channels repeaters excluding the collector repeater, for example, 31.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2016-170087, filed on Aug. 31, 2016, the entire disclosure of which is incorporated by reference herein.

REFERENCE SIGNS LIST

1 Multisite trunking system
Network
3, 3a, 3b Coverage area
4, 4a, 4b Repeater system
5, 5a, 5b Repeater controller
6, 6a, 6b, 6a_1, 6a_2, 6a_3, 6a_n, 6b_1, 6b_2, 6b_3, 6a_n Repeater
7, 7a, 7b, 7c, 7d Wireless terminal
8 Control server
10, 20 Controller
11, 21 CPU
12, 22 I/O
13, 23 RAM
14, 24 ROM
15, 25 Display
16, 26 Operation unit
51, 64 Communication IF
52 Allocator
53 Determination unit
54 Switching controller
55 Determination result acquisition unit 56 Processor
57 Memory
58 Interface
60, 65, 70 Antenna
61, 72 Transmitter
62, 67, 73, 78 Baseband processor
63 Input unit
66, 76 Receiver
68 Output unit
71 Transmission/reception selector
74 A-D converter
75 Microphone
77 Quality detector
79 D-A converter
80 Speaker
81 Display screen
82 Check box
83 List display part
84 Target display part

The invention claimed is:

1. A multi-site trunking system comprising:
a plurality of wireless terminals;
a master site for serving as a repeater system including (i) a plurality of repeaters to each of which a unique channel is assigned, and (ii) a repeater controller that controls the plurality of repeaters, the master site relaying communications between the plurality of wireless terminals; and
a slave site for serving as a repeater system including (i) a plurality of repeaters to each of which a unique channel is assigned, and (ii) a repeater controller that controls the plurality of repeaters, the slave site relaying communications between the plurality of wireless terminals for compensating a coverage area of the master site, wherein the repeater controller included in the repeater system serving as the slave site includes:
an allocator for, in response to a communication request from a first wireless terminal standing by in the channel of one of the plurality of repeaters with a second wireless terminal, allocating the channel of one of the plurality of repeaters to the first wireless terminal, and relays communications between the first wireless terminal and the second wireless terminal to the repeater having the allocated channel;
a determination unit for determining whether there is a shortage of allocatable channels, the allocatable channels being allocatable to the communications between the plurality of wireless terminals; and
a switching controller for, when the determination unit has determined that there is a shortage of allocatable channels, controlling at least one controlling repeater among the plurality of repeaters that performs transmission and reception of a control signal to cause the controlling repeater to transmit, to a wireless terminal standing by in the channel of the controlling repeater, a switching signal designating standby in a channel of a controlling repeater that performs transmission and reception of a control signal among the plurality of repeaters controlled by a repeater controller included in the master site, wherein
the wireless terminal, upon receiving the switching signal, detects communication quality of the channel of the controlling repeater included in the master site, and shifts a standby channel to the channel of the controlling repeater included in the master site when the communication quality is sufficient.

2. The multi-site trunking system according to claim 1, wherein the repeater controller included in the repeater system serving as the slave site further includes:
a determination result acquisition unit for acquiring a determination result indicating whether there is a shortage of allocatable channels for the other repeater controller, wherein when the determination unit has determined that there is a shortage of allocatable channels, and the determination result acquired by the determination result acquisition unit indicates that there is no shortage of allocatable channels, the switching controller controls at least one controlling repeater to cause the controlling repeater to transmit the switching signal to the wireless terminal standing by in the channel of the controlling repeater.

3. The multi-site trunking system according to claim 1, wherein when an allowance ratio indicative of a ratio of allocatable channels in the channels for communication is equal to or less than a first threshold value, the determination unit determines that there is a shortage of allocatable channels.

4. The multi-site trunking system according to claim 2, wherein when an allowance ratio indicative of a ratio of allocatable channels in the channels for communication is equal to or less than a first threshold value, the determination unit determines that there is a shortage of allocatable channels.

5. The multi-site trunking system according to claim 1, wherein when a total of a quantity of the wireless terminal standing by in the channel of the at least one controlling repeater is equal to or greater than a second threshold value, the determination unit determines that there is a shortage of allocatable channels.

6. The multi-site trunking system according to claim 2, wherein when a total of a quantity of the wireless terminal standing by in the channel of the at least one controlling repeater is equal to or greater than a second threshold value, the determination unit determines that there is a shortage of allocatable channels.

7. The multi-site trunking system according to claim 3, wherein when a total of a quantity of the wireless terminals standing by in the channel of the at least one controlling repeater is equal to or greater than a second threshold value, the determination unit determines that there is a shortage of allocatable channels.

8. The multi-site trunking system according to claim 4, wherein when a total of a quantity of the wireless terminals standing by in the channel of the at least one controlling repeater is equal to or greater than a second threshold value, the determination unit determines that there is a shortage of allocatable channels.

9. A site switching method to be performed by a slave site included in a multi-site trunking system including (i) a plurality of wireless terminals, (ii) a master site for serving as a repeater system: including a plurality of repeaters to each of which a unique channel is assigned; and a repeater controller that controls the plurality of repeaters, and relaying communications between the plurality of wireless terminals, and (iii) the slave site for serving as a repeater system: including a plurality of repeaters to each of which a unique channel is assigned; and a repeater controller that controls the plurality of repeaters, and relaying communications between the plurality of wireless terminals for compensating a coverage area of the master site, the method comprising:
determining whether there is a shortage of channels allocatable to the communications between the plurality of wireless terminals; and upon determination that there is a shortage of allocatable channels, controlling at least one controlling repeater among the plurality of repeaters that performs transmission and reception of a control signal to cause the controlling repeater to transmit, to a wireless terminal standing by in the channel of the controlling repeater, a switching signal designating standby in a channel of a controlling repeater that performs transmission and reception of a control signal among a plurality of repeaters controlled by a repeater controller included in the master site wherein the wireless terminal, upon receiving the switching signal, detects communication quality of the channel of the controlling repeater included in the master site, and shifts a standby channel to the channel of the controlling repeater included in the master site when the communication quality is sufficient.

* * * * *